United States Patent
Ruocco et al.

(10) Patent No.: US 7,520,990 B2
(45) Date of Patent: Apr. 21, 2009

(54) ANAEROBIC WASTEWATER TREATMENT SYSTEM AND METHOD

(75) Inventors: Joseph J. Ruocco, Colwish, KS (US); Scott Dennis Kohl, Wichita, KS (US)

(73) Assignee: ICM, Inc., Colwich, KS (US)

( * ) Notice: Subject to any disclaimer, the term of this patent is extended or adjusted under 35 U.S.C. 154(b) by 0 days.

(21) Appl. No.: 11/711,310

(22) Filed: Feb. 27, 2007

(65) Prior Publication Data

US 2008/0142437 A1 Jun. 19, 2008

Related U.S. Application Data

(60) Provisional application No. 60/777,586, filed on Feb. 28, 2006.

(51) Int. Cl.
*C02F 3/28* (2006.01)

(52) U.S. Cl. .................. 210/603; 210/617; 210/188; 210/195.1; 210/512.1

(58) Field of Classification Search .............. 210/603, 210/615–617, 631, 188, 194, 195.1, 197, 210/292, 512.1
See application file for complete search history.

(56) References Cited

U.S. PATENT DOCUMENTS

| | | | |
|---|---|---|---|
| 3,300,402 A * | 1/1967 | Grich et al. ............. | 210/625 |
| 3,371,033 A | 2/1968 | Simmons et al. | |
| 3,920,550 A | 11/1975 | Farrell, Jr. et al. | |
| 3,956,128 A | 5/1976 | Turner | |
| 4,160,724 A * | 7/1979 | Laughton ............. | 210/605 |
| 4,411,780 A | 10/1983 | Suzuki et al. | |
| 4,469,599 A | 9/1984 | Gros et al. | |
| 4,534,864 A * | 8/1985 | Rigouard ............. | 210/603 |
| 4,536,286 A | 8/1985 | Nugent | |
| 4,561,974 A | 12/1985 | Bernard et al. | |
| 4,582,600 A | 4/1986 | Atkinson et al. | |
| 4,609,460 A | 9/1986 | Vellinga | |
| 4,613,434 A * | 9/1986 | Maatta ............. | 210/151 |
| 4,622,147 A | 11/1986 | Vellinga | |
| 4,627,917 A | 12/1986 | Morper | |
| 4,659,460 A | 4/1987 | Muller et al. | |
| 4,707,254 A | 11/1987 | Vellinga | |
| 4,915,841 A | 4/1990 | Lagana et al. | |
| 4,940,546 A | 7/1990 | Vogelpohl et al. | |
| 5,030,353 A | 7/1991 | Stuth | |

(Continued)

FOREIGN PATENT DOCUMENTS

CA 2022232 2/1991

(Continued)

*Primary Examiner*—Fred Prince
(74) *Attorney, Agent, or Firm*—Robert O. Blinn

(57) ABSTRACT

An anaerobic wastewater treatment system includes a recycle tank, a bioreactor tank and a bioselector for recapturing anaerobic microbial consortia particles escaping from the bioreactor tank and returning them to the bioreactor tank. The bioreactor tank receives recycled wastewater feed from a recycle tank and discharges via an overflow outlet treated wastewater and microbial consortia particles to a bioselector. The bioselector is adapted to separate entrained microbial consortia particles and return a feed to the bioreactor tank which including some of the treated wastewater received from the bioreactor tank and the microbial consortia particles received from the bioreactor tank. The bioselector provides a recycle feed to the recycle tank. Overflow from the bioselector provides an effluent of treated wastewater leaving the system.

3 Claims, 2 Drawing Sheets

U.S. PATENT DOCUMENTS

| | | | |
|---|---|---|---|
| 5,096,579 A | 3/1992 | Jordan et al. | |
| 5,126,238 A | 6/1992 | Gebhard et al. | |
| 5,205,935 A | 4/1993 | Ruocco | |
| 5,230,794 A | 7/1993 | Heijnen et al. | |
| 5,254,253 A | 10/1993 | Behmann | |
| 5,328,105 A | 7/1994 | Sims et al. | |
| 5,336,398 A | 8/1994 | Russell et al. | |
| 5,338,447 A * | 8/1994 | Vellinga | 210/195.1 |
| 5,417,937 A | 5/1995 | Voigt et al. | |
| 5,534,159 A | 7/1996 | Krieger | |
| 5,565,098 A | 10/1996 | Vellinga | |
| 5,755,973 A | 5/1998 | Krieger | |
| 5,773,526 A | 6/1998 | Van Dijk | |
| 5,855,785 A | 1/1999 | Heijnen et al. | |
| 5,961,830 A | 10/1999 | Barnett | |
| 5,972,216 A | 10/1999 | Acernese et al. | |
| 5,972,219 A | 10/1999 | Habets et al. | |
| 5,976,868 A | 11/1999 | Buisman | |
| 5,985,150 A | 11/1999 | Versprille et al. | |
| 6,126,827 A | 10/2000 | Johnson, Jr. et al. | |
| 6,139,730 A | 10/2000 | Buehler et al. | |
| 6,156,205 A | 12/2000 | Buisman et al. | |
| 6,159,380 A | 12/2000 | Russell et al. | |
| 6,221,652 B1 | 4/2001 | Janssen et al. | |
| 6,309,553 B1 | 10/2001 | Lanting et al. | |
| 6,372,139 B1 | 4/2002 | Habets et al. | |
| 6,616,833 B2 | 9/2003 | Lynch | |
| 6,623,640 B2 | 9/2003 | Lanting et al. | |
| 6,758,886 B2 | 7/2004 | Vellinga | |
| 6,767,464 B2 | 7/2004 | Boyd et al. | |
| 6,790,359 B2 * | 9/2004 | Miller, III | 210/603 |

FOREIGN PATENT DOCUMENTS

| | | | |
|---|---|---|---|
| CA | 1295058 | | 1/1992 |
| CA | 2084090 | | 1/1992 |
| CA | 2080030 | | 6/1993 |
| CA | 2104433 | | 2/1994 |
| CA | 2160373 | | 10/1994 |
| CA | 1334036 | | 1/1995 |
| DE | 19532802 | * | 8/1997 |
| JP | 09-070599 A | | 3/1997 |
| KR | 10-0183432 B | | 12/1997 |
| KR | 10-0152172 B | | 10/1998 |

* cited by examiner

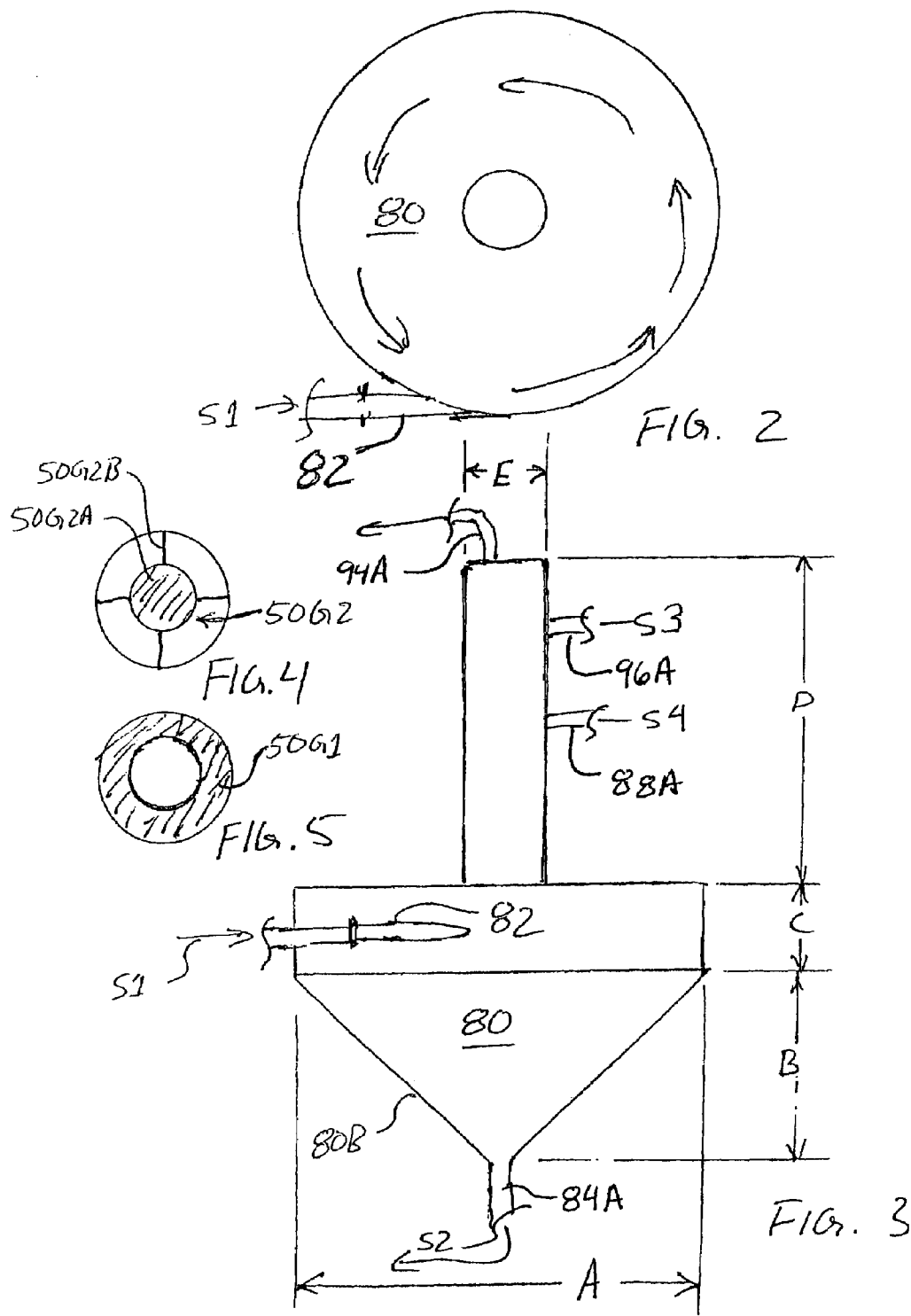

US 7,520,990 B2

ANAEROBIC WASTEWATER TREATMENT SYSTEM AND METHOD

CROSS REFERENCES TO RELATED APPLICATIONS

This application claims the benefit of U.S. Provisional Patent Application No. 60/777,586 filed Feb. 28, 2006.

FIELD OF THE INVENTION

This invention relates to an anaerobic wastewater treatment system and method.

BACKGROUND OF THE INVENTION

Anaerobic bioreactors have typically included a bioreactor tank for containing a suspension of naturally forming anaerobic bacteria granules which is a mixture or consortium of bacteria adapted for digesting biological oxygen demand (BOD) or biological waste in wastewater. Those skilled in the art refer to these anaerobic bacteria granules as "microbial consortia particles" or "microbial consortia culture particles" or "active microbial consortia particles" in the case of viable, active anaerobic bacteria granules. The use of such microbial consortia particles for digesting waste in wastewater is well known to those who are skilled in the art. The microbial consortia particles are maintained in a fluidized or expanded or upflow blanket bed by an upwelling flow of wastewater which generally enters the lower end of the bioreactor tank in a generally distributed fashion. Treated wastewater generally exits a typical bioreactor tank in an overflow discharge at the upper end of the bioreactor. An anaerobic bioreactor tank using a culture of microbial consortia particles is most effective if the particles interact with the wastewater in a fluid bed environment. The microbial consortia particles typically have an average size ranging in diameter approximately between 0.5 mm and 3 mm. The microbial consortia particles interact with organic waste and produce various biogas byproducts including methane and carbon dioxide. They also add to their biomass as they digest organic waste. The amount of organic waste in wastewater is measured by biological oxygen demand (BOD) or chemical oxygen demand (COD). Biological oxygen demand (BOD) is a measurement that describes the organic loading in waste water and is well known to those skilled in the art. Typically, the preferred BOD measurement used by those skilled in the art is a five day test for BOD measurement. Chemical oxygen demand (COD) is also a measurement that describes the organic loading in waste water and also is well known to those skilled in the art. COD measurements are more commonly used in the art of anaerobic digestion of organic waste. Methane is not soluble in water, so methane bubbles often form on the surfaces of the microbial consortia particles causing the granules to become buoyant and thus rise within the fluidized bed column. Typically, the interior of the bioreactor tank is provided with various baffle structures typically in the form of inverted conical or inclined plate structures. The purpose of these baffle structures is to contact the microbial consortia particles and impede their migration to the surface of the fluidized bed column. The contact of the granules with baffle structure causes the microbial consortia particles to shed their buoyant methane bubbles and thus impede their migration to the surface of the water and the overflow discharge of the bioreactor. Even with the use of such baffles and other internal selectors or settlers, the tendency of buoyant granules to escape with an overhead discharge is a significant constraint for prior art bioreactors. This constraint reduces the capacity of prior art bioreactors below the biological capacity of microbial consortia particles within a prior art bioreactor. Such internal structures also occupy a significant portion of the volume of prior art bioreactors. This constraint imposed by the need to prevent the escape of microbial consortia particles from a bioreactor tank can limit the capacity, of a bioreactor tank to about 50% of the capacity of a fully charged bioreactor. Accordingly, what is needed is an anaerobic wastewater treatment system in which the potential capacity of a bioreactor tank is substantially fully exploited and wherein the constraint imposed by the need to retain microbial consortia particles is eliminated.

BRIEF DESCRIPTION OF THE INVENTION

The above described need is addressed by an anaerobic wastewater treatment system which includes a recycle tank, a bioreactor tank and a bioselector.

The recycle tank is of conventional design as understood by those skilled in the art. The recycle tank includes a wastewater intake for receiving wastewater, a recycle inlet for receiving recycled water, a recycle outlet, a means for adding nutrients and a means for introducing additives for balancing pH.

The bioreactor tank has an intake near its lower end, an overflow outlet toward its upper end as well as a biogas vent at its extreme upper end. The intake of the bioreactor tank is connected with the recycle outlet of the recycle tank and receives a recycle mixture from the recycle tank. The bioreactor tank contains a suspension of wastewater and a multitude of microbial consortia particles. The anaerobic bacteria of the microbial consortia particles are adapted for digesting the waste of the recycle mixture and producing biogasses including methane and carbon dioxide. The bioreactor overflow outlet allows the overflowing escape of the bioreactor tank suspension including some microbial consortia particles. Preferably, the bioreactor tank includes a gas disengagement portion located under the overflow outlet. The gas disengagement portion removes gas bubbles from the surfaces of the entrained microbial consortia particles before the entrained microbial consortia particles and the treated water flow out through the overflow outlet.

The bioselector receives treated water and entrained microbial consortia particles from the bioreactor tank overflow outlet. The bioselector is designed to cause relatively dense microbial consortia particles to settle to the bottom of the bioselector. A bioselector return outlet at the bottom of the bioselector collects the relatively dense microbial consortia particles and returns the microbial consortia particles entrained with a portion of the treated wastewater to the bioreactor tank intake preferably via a bioselector return pump. The bioselector return pump is preferably adapted for conveying the suspension without significantly damaging the microbial consortia particles. The applicant's have learned bacterial granules having relatively high densities with a specific gravity greater than one are more effective for digesting waste than low density granules. Accordingly, the bioselector is adapted to release low density granules having a specific gravity less than one from the system while retaining higher density granules having a specific gravity greater than one in the system. As the system operates for an extended period of time, granules of insufficient density are purged from the system and are generally no longer present in any significant numbers in the bioreactor tank or the overflow stream from the bioreactor. Appropriate pumps for the bioselector return pump may, for example, include a diaphragm type pump, a hose type pump, or a pressure differential—venturi induction type pump. The suspension flowing through the bioselector return outlet to the bioreactor tank intake includes the most dense, healthy, and acclimated of the entrained microbial consortia particles that enter the bioselector through the tangential intake. The bioselector has a recycle outlet for conveying mostly granule free treated wastewater to the recycle inlet of the recycle tank. A recycle control valve in the pipe leading from the bioselector recycle outlet to the recycle inlet of the recycle tank controls the amount of recycle flow to the recycle tank. The bioselector also has a vent for releasing additional biogasses. Finally, the bioselector has an overflow outlet for discharging treated wastewater from the system on an overflow basis. The flow rate through the overflow outlet is preferably controlled by controlling the flow rate through the recycle outlet by controlling the setting of the recycle control valve.

In the preferred embodiment, the bioselector includes a generally cylindrical body portion and a generally conical portion positioned beneath the cylindrical body portion. The generally conical portion terminates in the bioselector return outlet. The bioselector intake preferably has a tangential inlet geometry and is preferably located above the return outlet and preferably in the wall of the body portion adjacent to the upper end of the conical portion. The tangential intake is connected with the overflow outlet of the bioreactor. Because the intake stream is generally tangent to the inside wall of the bioselector, the volume of the suspension within the bioselector generally rotates around the bioselector. As the suspension rotates, entrained microbial consortia particles migrate toward the walls of the bioselector and down the conical portion toward the return outlet where the granules are collected with a portion of the treated wastewater for return to the bioreactor tank as described above.

BRIEF DESCRIPTION OF THE DRAWINGS

FIG. 2 is a top view of the bioselector.
FIG. 3 is a side view of the bioselector.
FIG. 4 is sectional top view of a disc portion of a donut and disc gas disengagement structure taken from plane 4-4 of FIG. 1.
FIG. 5 is sectional top view of a donut portion of a donut and disc gas disengagement structure taken from plane 5-5 of FIG. 1.

DETAILED DESCRIPTION

Figure 1:
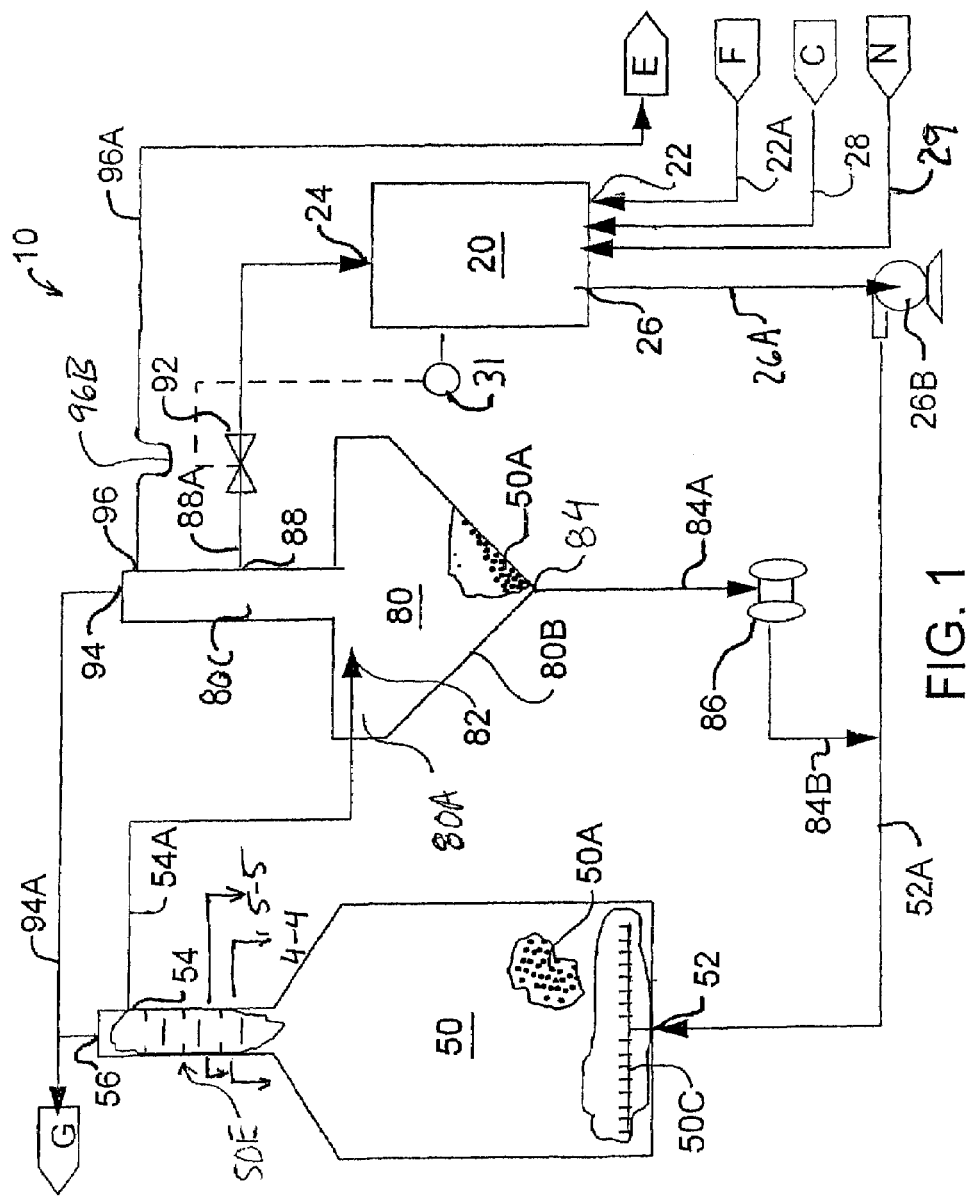
FIG. 1 is a schematic of the anaerobic wastewater treatment system.

Referring to FIG. 1, an anaerobic wastewater treatment system 10 generally includes a recycle tank 20, a bioreactor tank 50 and a bioselector 80.

Recycle tank 20 includes an intake 22 for receiving wastewater from a wastewater feed pipe 22A, a recycle inlet 24 for receiving recycled treated waste water from bioselector 80, a recycle outlet 26 for feeding a recycle mixture to the intake of bioreactor tank 50. Recycle outlet 26 connects via a recycle feed pipe 26A and a recycle feed pump 26B to an intake 52 of bioreactor tank 50. Also, preferably included with recycle tank 20 are a means for adding nutrients 28 and a means for introducing additives for balancing pH 29.

Bioreactor tank 50 has an intake 52 near its lower end. Intake 52 is connected with the recycle outlet 26 of the recycle tank 20 and receives a recycle mixture from recycle tank 20 via recycle feed pump 26B through pipe 52A. As shown in FIG. 1, pipe 52A also receives a flow from bioselector 80 via bioselector pump discharge pipe 84B as will be described in greater detail below. The flow of intake 52 is preferably generally evenly distributed at the lower end of bioreactor tank 50 by a distribution header 50C. Distribution header 50C is schematically diagramed in FIG. 1 and is typical of distribution headers well known by those skilled in the art. Bioreactor tank 50 contains a suspension of wastewater and a multitude of active microbial consortia particles 50A. Generally, these microbial consortia particles would constitute roughly 50% to 90% of the volume of the mixture and would constitute approximately 5% dry solids by weight. This represents a relatively high space loading of active microbial consortia particles 50A. Those skilled in the art will readily appreciate that these anaerobic microbial consortia tend to function best in a temperature range generally between 85° F. and 100° F. The bacteria of the active microbial consortia particles are adapted for digesting the waste present in the recycle mixture. The bacteria produce biogasses including methane and carbon dioxide.

Bioreactor tank 50 has an overflow outlet 54 near the upper end of gas disengagement portion 50E. Overflow outlet 54 allows the overflowing escape of the bioreactor suspension including entrained microbial consortia particles 50A via a bioreactor overflow pipe 54A. Bioreactor tank 50, in this example, preferably includes a generally narrow gas disengagement portion 50E. In this example, gas disengagement portion 50E includes a gas separation elements. Gas separation elements, may, for example include a series of alternating donut elements 50G1 and disc elements 50G2 as diagrammed in FIG. 1. A disc element 50G2 is illustrated in detail in FIG. 4 taken from plane 4-4 of FIG. 1. Disc element 50G2 includes a central disc 50G2A which is supported by four radial struts 50G2B. A donut element 50G1 is illustrated in detail in FIG. 5 taken from plane 5-5 of FIG. 1. Donut element 50G1 is generally a horizontal flange projecting from the inside wall of disengagement portion 50E. Such a donut and disc arrangement is well known by those skilled in the art. As gas laden microbial consortia particles flow up through gas disengagement portion 50E, the flow of this suspension is agitated causing the relatively dense microbial consortia particles to accelerate back and forth as they travel the torturous path between the alternating doughnut and disc elements 50G1 and 50G2. This causes gas bubbles adhering to the surfaces of the microbial consortia particles to disengage from microbial consortia particles 50A. Biogas vent 56 collects the biogas that is disengaged from microbial consortia particles 50A and vents that gas to a biogas collection pipe 94A. The remaining suspension of water and generally gas free microbial consortia particles 50A is then received by bioreactor tank overflow pipe 54A and conveyed to the inlet of bioselector 80.

Bioselector 80 is designed to receive treated wastewater and entrained microbial consortia particles 50A from overflow outlet 54 of bioreactor tank 50 and capture sufficiently dense microbial consortia particles 50A and return them with a portion of the treated wastewater to bioreactor tank 50 while generally discharging any insufficiently dense microbial consortia particles from the system. The overflow stream from bioreactor tank 50 contains entrained microbial consortia particles 50A including mostly sufficiently dense and effective microbial consortia particles and possibly some insufficiently dense ineffective microbial consortia particles. Bioselector 80 receives overflowing suspension from bioreactor tank overflow pipe 54A via a bioselector intake 82. Bioselector 80 is designed to allow sufficiently dense microbial consortia particles to settle with a portion of the treated wastewater for return to bioreactor tank 50 via a return outlet 84. By sufficiently dense, the applicants refer to microbial consortia particles having a specific gravity greater than 1. Accordingly, bioselector 80 purges the system of ineffective insufficiently dense microbial consortia particles by allowing those microbial consortia particles to escape the system. By insufficiently dense, the applicants refer to microbial consortia particles having a specific gravity less than 1. As the system operates for an extended period of time, insufficiently dense microbial consortia particles are gradually removed from the system such that, eventually, bioreactor tank 50 is almost exclusively populated with sufficiently dense active and viable microbial consortia particles.

Bioselector 80 return outlet 84 is connected to bioreactor tank 50 intake 52 via a return pipe 84A and a pump 86. Pump 86 is adapted for conveying the suspension to bioreactor tank 50 without inflicting undue amounts of damage to microbial consortia particles 50A. The suspension flowing through return pipe 84A includes the sufficiently dense microbial consortia particles 50A that enter bioselector 80 through intake 82.

Bioselector 80 has a recycle outlet 88 for conveying mostly microbial consortia-free treated wastewater via a recycle pipe 88A to recycle inlet 24 of recycle tank 20. A recycle valve 92 in recycle pipe 88A controls the amount of recycle flow to recycle tank 20. A level indicator 31 associated with recycle tank 20 provides input for controlling the operation of recycle valve 92. Bioselector 80 also has a vent 94 for releasing additional biogasses to biogas collector pipe 94A which also receives biogasses from biogas vent 56 of bioreactor tank 50.

An overflow outlet 96 is located above recycle outlet 88. Overflow outlet 96 discharges treated wastewater from bioselector 80 and system 10 as effluent through effluent discharge pipe 96A. Effluent discharge pipe 96A includes a J elbow 96B for preventing the escape of gas via discharge pipe 96A and insuring the gas is vented through vent 94A. Insufficiently dense microbial consortia particles are not captured by the operation of bioselector 80 and are expelled from the system via overflow outlet 96. As the system operates for an extended period of time, the number of insufficiently dense granules escaping via outlet 96 decreases as the number of such insufficiently dense granules within the system decreases.

In the example shown in FIG. 1, bioselector 80 includes a body portion 80A, a conical lower portion 80B and a narrow, cylindrical effluent and recycle outlet portion 80C. Conical lower portion 80B is positioned beneath body portion 80A. Effluent and recycle outlet portion 80C is located directly above body portion 80A. Bioselector 80 is diagrammed in greater detail in FIGS. 2 and 3. Conical portion 80B communicates with return outlet 84 located at the center and lower end of conical portion 80B. In the preferred embodiment shown in FIGS. 2 and 3, intake 82 of bioselector 80 has a tangential inlet geometry and is located above return outlet 84 and preferably in the wall of body portion 80A adjacent to the upper end of the conical portion 80B. Tangential intake 82 is oriented so that the inlet flow is generally tangent to the wall of bioselector 80. This orientation of tangential intake 82 can be best seen in FIG. 2 which is a top view of bioselector 80. Tangential intake 82 sets up a tangential, swirling flow which causes the volume of the suspension within bioselector 80 to rotate. As the suspension rotates, entrained microbial consortia particles 50A migrate toward the walls of bioselector 80 and mechanically contact the walls. This causes microbial consortia particles 50A to lose momentum and then descend generally along the walls of the conical portion 80B toward return outlet 84.

The addition of bioselector 80 provides an important advantage in the anaerobic wastewater treatment system 10 of the present invention. The addition of bioselector 80 allows for a significant increase in the space loading capacity of bioreactor 50. Typically, the quantity of microbial consortia particles 50A in bioreactor tank 50 would be constrained by the tendency of those microbial consortia particles to escape bioreactor tank 50. With the addition of bioselector 80, the egress of microbial consortia particles 50A from bioreactor tank 50 is no longer a constraint in the system. Escaping microbial consortia particles of sufficient density are captured by bioselector 80 and returned to bioreactor tank 50. With increased space loading it is now possible to accommodate a higher COD/BOD feed rate for a bioreactor tank of a given volume. Bioselector 80 also selects the fittest microbial consortia particles and returns them to bioreactor tank 50. In this case, the most productive and fit microbial consortia particles tend to be those that are relatively dense, that is having a specific gravity in excess of 1. Bioselector 80 is adapted to separate and retain the relatively more dense, productive microbial consortia particles while rejecting and discharging the unfit, low density microbial consortia particles from the system. With a separate bioselector 80 fulfilling the function of capturing and retaining active, viable, dense microbial consortia particles, it is no longer necessary to have complex structures inside bioreactor tank 50 for retaining such particles. Thus, bioreactor tank 50 may be optimized for the intimate interaction of granules 50A and wastewater to accomplish wastewater treatment with little or no consideration of microbial consortia particle retention or selection in the bioreactor. The COD/BOD input to bioreactor tank 50 may now also be increased to the full capacity of the microbial consortia particles present in the system. This division of functions simplifies the structures of the system and optimizes the biological processing capabilities of the system. Bioreactor tank 50, with the aid of bioselector 80 is now able to sustain a significantly higher loading rate per unit volume and thus operate at a much higher rate.

The following example is merely one of a multitude of possible ways for practicing the invention as described above. All of the values here are intended to be approximate in nature. This example may be scaled up or down as desired. This example considers the treatment of a 100 gallon per minute (0.378 $m^3$ per minute) waste water stream containing 1.25 lbs/$ft^3$ (20 kg/$m^3$) BOD load. The selected space loading rate for bioreactor tank 50 may be a relatively high 2.50 lbs/$ft^3$/day (40 kg/$m^3$/day). Generally, these microbial consortia particles would constitute roughly 50% to 90% of the volume of the mixture and would constitute approximately 5% dry solids by weight. Generally the system runs with at least 12" of water pressure and generally at a temperature between 85° F. and 100° F. In this example, recycle tank 20 preferably has a volume of approximately 2400 gallons (9.072 $m^3$) and may be roughly cylindrical having a diameter of 8 feet and a height of 8 feet (2.46 m×2.46 m). Reactor tank 50 preferably has a volume of approximately 72,000 gallons (272.16 $m^3$) with approximate main body dimensions 16 feet (4.87 m) in diameter by 48 feet (14.61 m) in height. Gas disengagement portion 50E attached to the top of the reactor tank 50 may have approximate dimension of 3 feet in diameter by 8 feet in height (1.0 m×2.6 m). The bioselector unit 80 preferably has approximately the following dimensions in accordance with the dimension indicators FIG. 3: A is 8 feet, B is 4 feet, C is 1.75 feet, D is 6.5 feet and E is 1 foot. That is, the cone shaped bottom portion of bioselector 80 may be approximately 8 feet in diameter and 4 feet in height. The body portion of bioselector 80 may have dimensions of approximately 8 feet in diameter by 1.75 feet in height. The upper portion of bioselector 80 may have a diameter of approximately 1 foot and a height of approximately 6.5 feet.

The operation of the example system may include the following flow rates: One hundred (100) gallons per minute (0.378 m$^3$ per minute) waste water flow containing 1.25 lbs/ft$^3$ (20 kg/m$^3$) biological oxygen demand (BOD) load wastewater flow would enter system 10 via feed pipe 22A into recycle tank 20. A recycle mixture would leave recycle tank 20 at a rate of 300 gallons per minute (1.134 m$^3$ per minute) via recycle outlet pipe 26 and flows to bioreactor 50 via pump 26B into flow distributor 50C into the bottom of reactor tank 50. The mixture of recycled water and wastewater passes up through the bed of microbial consortia particles 50A in reactor tank 50 and the BOD content is reduced biologically by the anaerobic microbial consortia culture. The BOD value is reduced approximately 95% to a value of approximately 0.0625 lbs/ft$^3$ (1 kg/m$^3$) BOD value. Liquid flow passes out the top of reactor 50 through gas disengagement portion 50E. Biogas continues through biogas discharge pipe 94A and onto further scrubbing treatment, if necessary. After scrubbing treatment the biogas is ready for use as boiler fuel or feedstock source for chemical synthesis.

The liquid stream remaining after the disengagement of the biogas in gas disengagement portion 50E along with some microbial consortia particles passes through bioreactor overflow pipe 54A into bioselector 80. This stream is indicated as stream S1 in FIG. 3. The flow rate of stream S1 should be approximately 300 gpm. The tangential inlet geometry and high flow velocity in excess of approximately 4 feet per second (1.3 m/s) to bioselector 80 causes the liquid to swirl inside bioselector 80 generating centrifugal forces. These forces cause the denser, viable microbial consortia particles 50A to move to the walls of bioselector 80 where collision with the walls reduces their velocity. These slower moving, denser particles then settle to the bottom of bioselector 80. The active microbial consortia particles captured by bioselector 80 pass through return pipe 84A and are pumped out of the bottom of the bioselector 80 directly back into bioreactor tank 50 via bioselector return pump 86. The stream passing through return pipe 84A is illustrated as a bioselector return stream S2 in FIG. 3. In this example, the flow rate of bioselector return stream S2 may range between 5 gpm and 15 gpm and preferably, in this example, has a rate of approximately 10 gpm. Preferably, approximately 100 gallons (0.378 m$^3$) per minute of the remaining liquid which may contain small amounts of low-density microbial consortia particles passes through effluent discharge pipe 96A as discharge from the system. This effluent stream is illustrated as stream S3 in FIG. 3. A recycle stream S4 shown in FIG. 3 exits bioselector 80 and is conveyed via recycle pipe 88A to recycle tank 20 where it dilutes incoming wastewater feed for bioreactor tank 50. The flow rate of recycle stream S4 is approximately 200 gallons per minute (0.756 m$^3$ per minute) less the flow rate of stream S2, or approximately 190 gpm.

Thus, by the above example, those skilled in the art will readily appreciate bioselector 80 facilitates a relatively high density space loading of bioreactor tank 50. Bioselector 80 captures and returns viable high density microbial consortia particles and returns them to bioreactor tank 50 thus enabling bioreactor tank 50 to operate at a maximum space loading. With the addition of bioselector 80 it is possible to process more waste with less equipment at lower costs.

It is to be understood that while certain forms of this invention have been illustrated and described, it is not limited thereto, except in so far as such limitations are included in the following claims and allowable equivalents thereof.

Having thus described the invention, what is claimed as new and desired to be secured by Letters Patent is:

1. An anaerobic wastewater treatment system, comprising:
    (a) a recycle tank including an intake for receiving wastewater, a recycle inlet for receiving recycled water and an outlet for discharging a recycle mixture including recycled water and wastewater,
    (b) a bioreactor tank having an intake near its lower end, an overflow outlet toward its upper end and a biogas vent at its extreme upper end, the intake of the bioreactor tank connected with the recycle tank outlet for receiving the recycle mixture from the recycle tank, the bioreactor tank containing a fluidized bed including a multitude of anaerobic bacteria microbial consortia particles adapted for digesting waste and producing biogasses including methane and carbon dioxide, the bioreactor tank overflow outlet for overflowing escape of the bioreactor tank suspension including entrained microbial consortia particles and treated water mostly free of waste, the bioreactor tank further including gas disengagement portion proximate to the overflow outlet for mechanically separating gas bubbles from said microbial consortia particles prior to passage of the treated water and the entrained microbial consortia particles through the overflow outlet,
    (c) a bioselector having an intake with a tangent intake geometry in communication with the overflow outlet of the bioreactor tank for receiving bioreactor tank suspension including the treated water and microbial consortia particles from the bioreactor, the bioselector also having a generally circular cross section and a cone shaped lower end, the tangent intake geometry of the bioselector intake causing the treated water to swirl within the bioselector such that suspended microbial consortia particles move toward the walls of the bioselector, the microbial consortia particles subsequently sinking to the bottom of the bioselector for collection and return via the return outlet to the intake of the bioreactor, the bioselector also having a recycle outlet in communication with the recycle tank for passage of a recycle portion of the treated water to the recycle tank and an overflow outlet for releasing an effluent portion of the treated wastewater as treated effluent leaving the system.

2. An improved anaerobic wastewater treatment system of the type having a bioreactor tank containing a fluidized bed of active anaerobic microbial consortia particles for digesting waste and a recycle tank for receiving a stream of waste water and a stream of recycle water, the improvement comprising:
    a bioselector having an intake with a tangent intake geometry in communication with an overflow outlet of the bioreactor tank for receiving overflow from the bioreactor tank including treated wastewater and entrained microbial consortia particles from the bioreactor, the bioselector also having a generally circular cross section and a cone shaped lower end and a tangent intake geometry for causing swirling movement of the treated wastewater and entrained microbial consortia particles, the bioselector having a generally cone shaped lower end leading to discharge pipe in communication with the intake of the bioreactor tank, such that the active microbial consortia particles having sufficient specific gravity greater than one contact the cone shaped inner wall of the lower end and enter the discharge pipe and return to the bioreactor whereby the bioreactor may be charged with greater numbers of microbial consortia particles for greater spaced loading because escaping active microbial consortia particles may be captured and returned to the bioreactor by action of the bioselector.

3. A method for capturing and returning sufficiently dense anaerobic bacteria microbial consortia particles for digesting waste in wastewater where said microbial consortia particles have a specific gravity greater than one, the method for capturing and returning such microbial consortia particles to a highly charged bioreactor tank after escaping therefrom, comprising the following steps:

obtaining a bioreactor tank having: (a) a body portion for containing a volume for fluidized suspension of anaerobic bacteria microbial consortia particles, (b) an inlet at the lower end of the body portion having a distribution header for promoting distributed incoming flow of waste water, (c) a gas disengagement portion located above the body portion for disengaging biogas bubbles from the surfaces of microbial consortia particles, (d) a biogas vent for venting the released biogas bubbles and (e) an overflow outlet for passage of treated wastewater and some entrained escaping microbial consortia particles from the bioreactor tank, obtaining a bioselector including: (a) a cone shaped lower portion, (b) an inlet having tangential inlet geometry for promoting swirling flow inside the bioselector, the inlet located generally above the cone shaped lower portion, (c) an outlet located above the inlet for overflowing escape of treated wastewater effluent, and (d) a discharge outlet in communication with the lower end of the cone shaped lower portion, connecting the inlet of the bioselector to the overflow outlet of the bioreactor tank, connecting the discharge outlet of the bioselector with the inlet of the bioreactor tank, such that overflow from the bioreactor tank with entrained escaping active microbial consortia particles enters the bioselector through the tangential inlet and swirls around the cone shaped lower portion of the bioselector such that active microbial consortia particles sink to the bottom of the cone shaped lower portion for collection in the discharge outlet for return to the bioselector, whereby escaping microbial consortia particles from a highly charged bioreactor tank may be returned to the bioreactor tank thereby allowing the bioreactor tank to operate at a high level of space loading.

\* \* \* \* \*